US007848458B2

(12) United States Patent
Ochiai et al.

(10) Patent No.: US 7,848,458 B2
(45) Date of Patent: Dec. 7, 2010

(54) COMMUNICATION APPARATUS

(75) Inventors: Mari Ochiai, Tokyo (JP); Akinori Taira, Tokyo (JP); Yoshitaka Hara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 675 days.

(21) Appl. No.: 11/815,315

(22) PCT Filed: Feb. 16, 2006

(86) PCT No.: PCT/JP2006/302716

§ 371 (c)(1),
(2), (4) Date: Aug. 2, 2007

(87) PCT Pub. No.: WO2006/088081

PCT Pub. Date: Aug. 24, 2006

(65) Prior Publication Data

US 2009/0022231 A1    Jan. 22, 2009

(30) Foreign Application Priority Data

Feb. 18, 2005    (JP)    ............................. 2005-042352

(51) Int. Cl.
*H03K 9/00* (2006.01)
(52) U.S. Cl. .................... 375/316; 375/295; 375/260; 375/259
(58) Field of Classification Search ................ 375/316, 375/295, 260, 259
See application file for complete search history.

(56) References Cited

U.S. PATENT DOCUMENTS 5,694,414 A    12/1997    Smith et al.

6,065,060 A * 5/2000 Liu et al. .................. 709/233
6,173,016 B1 * 1/2001 Suzuki ...................... 375/295

(Continued)

FOREIGN PATENT DOCUMENTS

JP        10 66039        3/1998

(Continued)

OTHER PUBLICATIONS

Madhukumar, "Performance studies of a multi-band multicarrier CDMA system with a simplified receiver structure using despreader before equalizer," 14th IEEE Proceedings on Personal, Indoor and Mobile Radio Communications, 2003, PIMRC 2003, Publication Date : Sep. 17-10, 2003, vol. 3, On pp. 2631-2635 vol. 3.*

(Continued)

*Primary Examiner*—Juan A Torres
(74) *Attorney, Agent, or Firm*—Oblon, Spivak, McClelland, Maier & Neustadt, L.L.P.

(57) ABSTRACT

A communication apparatus associated with a system that uses two or more discontinuous frequency bands. The communication apparatus includes a BPF (band pass filter) including a plurality of BPFs associated with signals having respective frequency bands; a controller that controls each unit to transmit/receive the signals having the respective frequency bands; a down-converter that down-converts a filtered signal into a baseband signal while switching frequencies under control of the controller; a receiver that performs predetermined reception processing under control of the controller; and a transmitter that performs predetermined transmission processing under control of the controller, and common hardware is used in communication in all frequency bands with respect to processing of the baseband signal.

9 Claims, 7 Drawing Sheets

U.S. PATENT DOCUMENTS

| | | | |
|---|---|---|---|
| 6,535,499 B1 * | 3/2003 | Futamura et al. | 370/342 |
| 6,609,010 B1 | 8/2003 | Dolle et al. | |
| 6,658,237 B1 | 12/2003 | Rozenblit et al. | |
| 2003/0235147 A1 * | 12/2003 | Walton et al. | 370/204 |
| 2004/0102172 A1 | 5/2004 | Hendin | |
| 2005/0227631 A1 * | 10/2005 | Robinett | 455/83 |
| 2005/0233715 A1 | 10/2005 | Laroia et al. | |

FOREIGN PATENT DOCUMENTS

| | | |
|---|---|---|
| JP | 10 503894 | 4/1998 |
| JP | 11 27231 | 1/1999 |
| JP | 11 284537 | 10/1999 |
| JP | 2000 201130 | 7/2000 |
| JP | 2003 101506 | 4/2003 |
| JP | 2003 101902 | 4/2003 |
| WO | WO 2005/104389 A1 | 11/2005 |

OTHER PUBLICATIONS

Yoshitaka Hara, et al. "System Configuration for Multiband MC-CDM Systems", Vehicular Technology Conference, vol. 3, XP010879010, Sep. 25, 2005, pp. 2062-2067.

* cited by examiner $f_1$ $f_2$

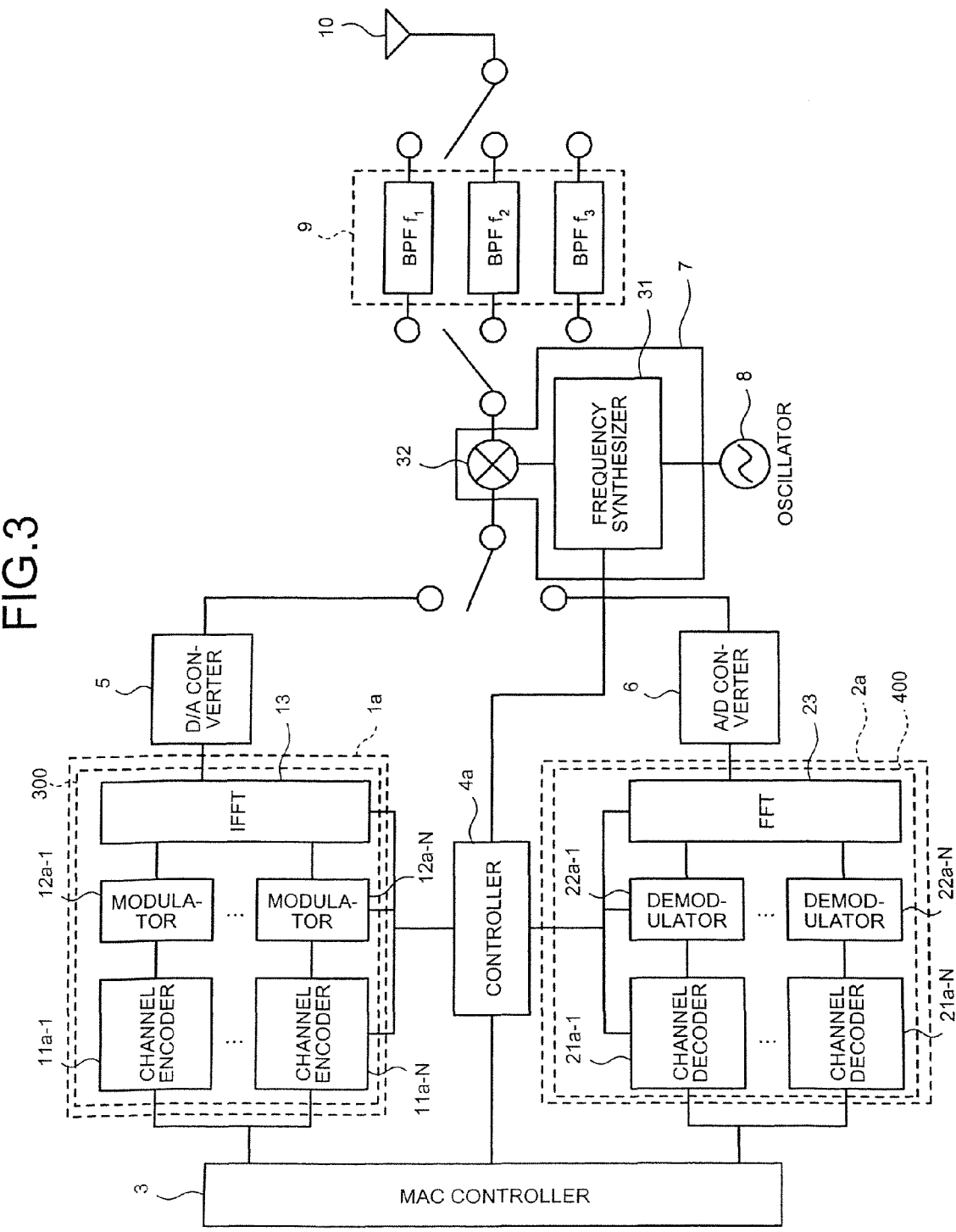

COMMUNICATION APPARATUS

TECHNICAL FIELD

The present invention generally relates to a communication apparatus belonging to a system in which it is possible to use a plurality of frequency bands. The present invention more particularly relates to a communication apparatus that operates as a multiband compatible terminal that receives signals having different frequencies and system bandwidth.

BACKGROUND ART

In recent years, there have been developed independent wireless communication systems, such as a personal digital cellular (PDC), a personal handyphone service (PHS), or a wireless local area network (LAN), i.e., multimode terminals that are compatible with a plurality of communication modes. Because these terminals apply various different communication modes in a single terminal, they are required to have hardware compatible with each system.

The following Patent Document 1 discloses a technology for reducing the size of hardware, on the assumption that the terminal is going to be used for communication using different frequency bands but a common modulation mode, by sharing number of subcarriers or a master clock and the like.

Patent Document 1: Japanese Patent Application Laid-open No. 2003-101506

DISCLOSURE OF INVENTION

Problem to be Solved by the Invention

In the conventional technology disclosed in Patent Document 1, although a part of the hardware can be shared, a problem lies in that other part of hardware, that is individually compatible with respective communication modes cannot be shared are required, moreover, control is executed in each communication mode.

In the multimode terminal compatible with several communication modes, even if a part of hardware can be shared to cope with a plurality of systems whose standards are independently defined, a problem lies in that the number of components is increased and control is complicated. Another problem is that a reduction in size of the terminal is difficult and control is executed in each communication mode.

In view of these problems, it is an object of the present invention to provide a communication apparatus (multiband compatible terminal) that receives signals having different frequencies and bandwidth with a structure and control simpler than those in the conventional technology on the premise of a single system that can use a plurality of frequency bands.

Means for Solving Problem

To solve the above problems, and to achieve the above objects, a communication apparatus associated with a system that uses two or more discontinuous frequency bands and that unifies a orthogonal frequency division multiplexing (OFDM) symbol timing in respective frequency bands includes a filtering unit (corresponding to band pass filters (BPFs) 9 described in the embodiment described below) including a plurality of BPFs associated with signals having the respective frequency bands; a controlling unit (corresponding to controller 4) that controls each unit that transmits/receives signals having the respective frequency bands; a down-converting unit (corresponding to down-converter 7) that down-converts a filtered signal into a baseband signal while switching frequencies under control of the controlling unit; a demodulating unit (corresponding to receiver 2) that performs predetermined reception processing under control of the controlling unit; and a modulating unit (corresponding to transmitter 1) that performs predetermined transmission processing under control of the controlling unit, wherein a part of hardware is shared in communication in all frequency bands with respect to processing of the baseband signal. It is to be noted that the expression "having the same OFDM symbol timing" as used herein means that most of signals transmitted through a plurality of frequency bands arrive with a time lag that is not greater than a guard interval on a reception side (in OFDM, a time deviation within a guard interval including a delayed wave is allowed. A signal exceeding the guard interval produces interference, but substantial transmission characteristics are not affected if an amount of the interference is sufficiently small).

According to the present invention, when a single system can use a plurality of frequency bands, a design adapted to a frequency having the widest band is carried out, and a filtered signal is down-converted into a baseband signal while switching frequencies under control of the controlling unit.

Effect Of The Invention

According to the present invention, though a filtered signal is down-converted into a baseband signal by switching frequencies depended on the used frequency band, hardware of processing for baseband signal is shared with all frequency bands. The common circuit for baseband signal processing makes structure and control for baseband processing simpler than conventional hardware.

BRIEF DESCRIPTION OF DRAWINGS

FIG. 2-1 is a view of a difference in bandwidth depending on each frequency band.

FIG. 2-2 is a view of a difference in bandwidth depending on each frequency band.

FIG. 2-3 is a view of a difference in bandwidth depending on each frequency band.

FIG. 3 is a view of a structural example of a second embodiment of a communication apparatus (multiband compatible terminal) according to the present invention.

FIG. 4-1 is a view of a difference in bandwidth depending on each frequency band.

FIG. 4-2 is a view of a difference in bandwidth depending on each frequency band.

FIG. 4-3 is a view of a difference in bandwidth depending on each frequency band.

Figure 1:
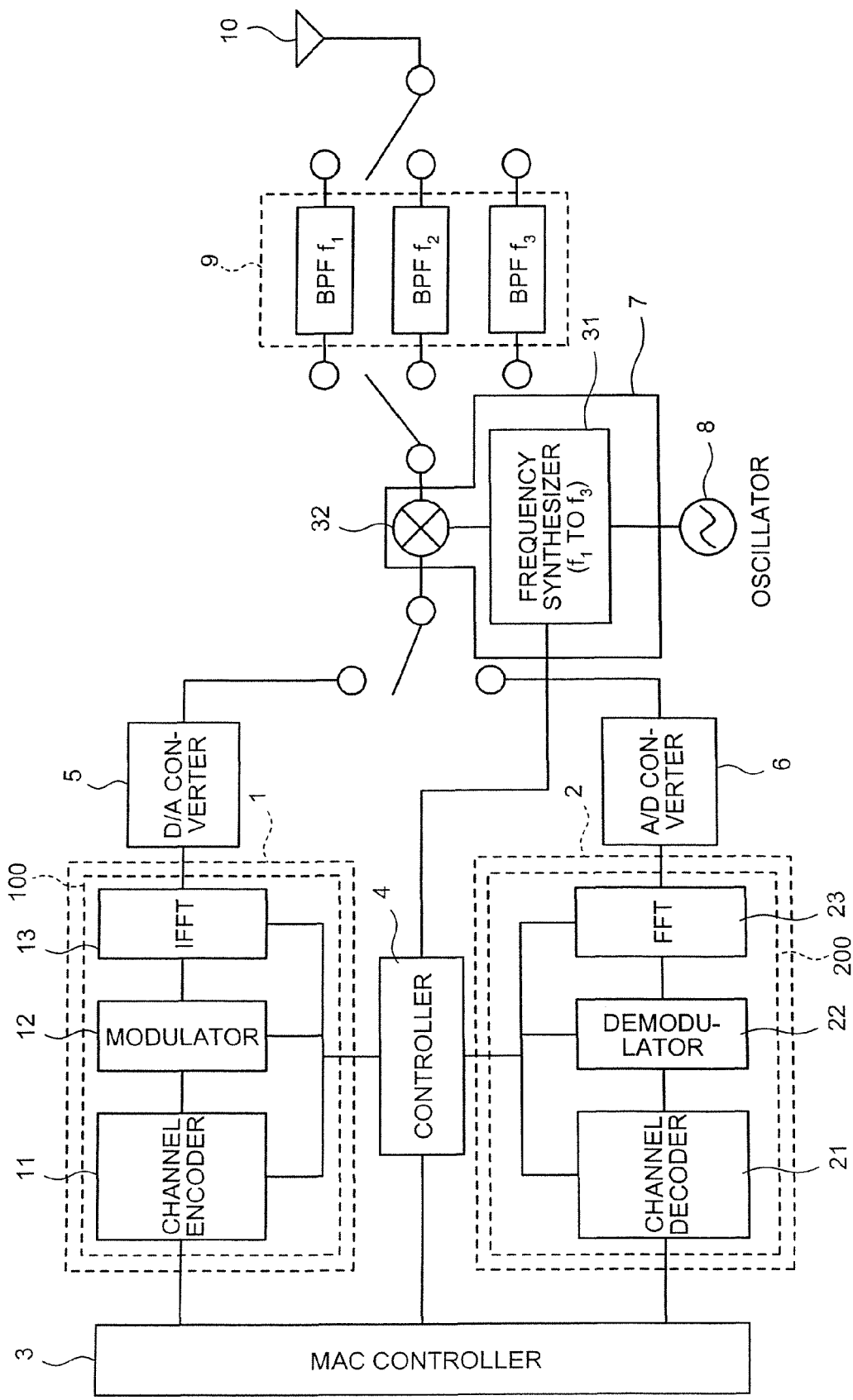
FIG. 1 is a view of a structural example of a first embodiment of a communication apparatus (multiband compatible terminal) according to the present invention.

EXPLANATIONS OF LETTERS OR NUMERALS 1, 1a transmitter
2, 2a receiver
3 MAC controller
4, 4a controller
5 D/A converter 6 A/D converter
7, 7b down-converter
8 oscillator
9 BPF (Band Pass Filter)
10 antenna
11, 11a-1 to 11a-N channel encoder
12, 12a-1 to 12a-N modulator
13 IFFT unit
21, 21a-1 to 21a-N channel decoder
22, 22a-1 to 22a-N demodulator
23 FFT unit
31 frequency synthesizer
32 mixer
33 adder

BEST MODE(S) FOR CARRYING OUT THE INVENTION

Exemplary embodiments of a communication apparatus according to the present invention will now be explained hereinafter in detail with reference to the accompanying drawings. It is to be noted that the embodiments do not limit the present invention.

First Embodiment

FIG. 1 is a view of a structural example of a first embodiment of a communication apparatus (multiband compatible terminal) according to the present invention. As shown in FIG. 1, the terminal includes a transmitter 1 that performs predetermined transmission processing, a receiver 2 that performs predetermined reception processing, an MAC controller 3 that performs transmission control, a controller 4 that controls respective circuits to receive signals having a plurality of frequency bands, a D/A converter 5, an A/D converter 6, a down-converter 7 that uses a frequency synthesizer 31 and a mixer 32 to down-convert a signal into a baseband signal, an oscillator 8, a band pass filter (BPF) 9 associated with frequencies $f_1$, $f_2$, and $f_3$, and an antenna 10. The transmitter 1 includes a known channel encoder 11, a known modulator 12, and an inverse fast Fourier transform (IFFT) unit 13 adapted to a bandwidth of the widest frequency band, whilst the receiver 2 includes an FFT unit 23 adapted to a bandwidth of the widest frequency band, a known demodulator 22, and a known channel decoder 21.

An operation of the thus configured terminal will now be explained. An example where a single system can use three discontinuous frequency bands, e.g., $f_1$, $f_2$, and $f_3$ ($f_1 < f_2 < f_3$) is assumed. A frequency band to be used is specified by a base station or determined at the initiative of the terminal based on a carrier sense. In the terminal, the frequency synthesizer 31 switches the frequencies ($f_1$, $f_2$, and $f_3$) under control of the controller 4.

In general, bandwidth is narrower and transmission rate is lower but the service area is wider in a low frequency band, whilst bandwidth is wider and transmission rate is higher but the service area is narrower in a high frequency band. In the example, transmission bands in the respective frequency bands are $f_1 < f_2 < f_3$.

Figures 1, 2:
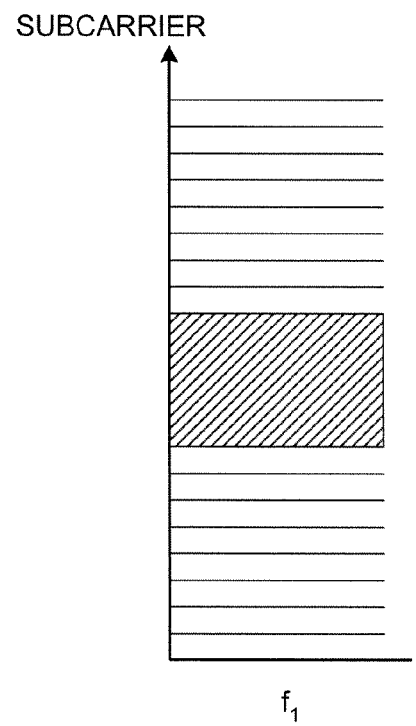
Figure 2:
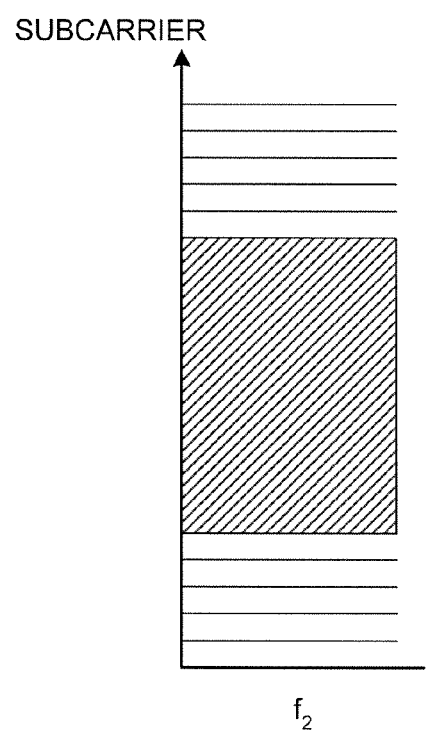
Figures 2, 3:
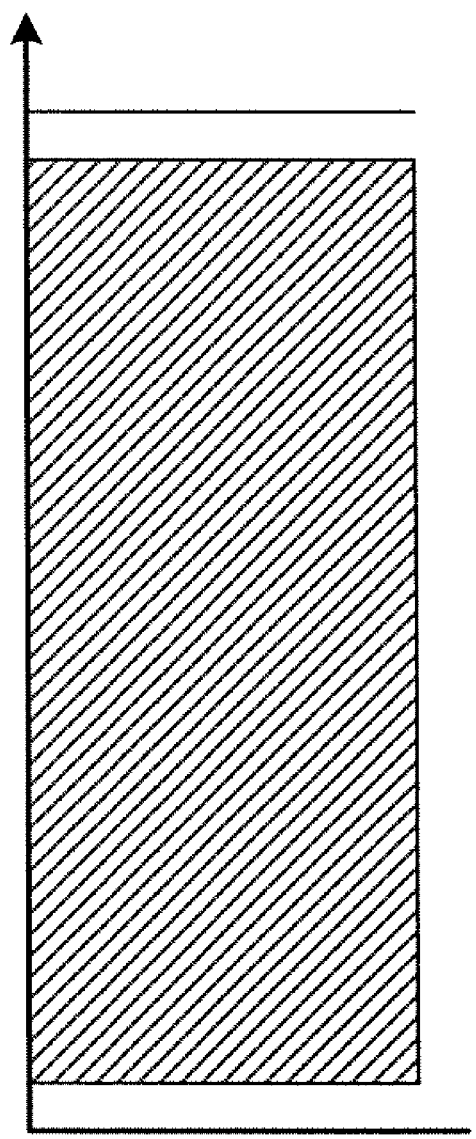
Figures 1, 4:
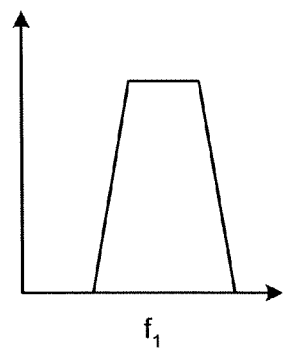
Figures 2, 4:
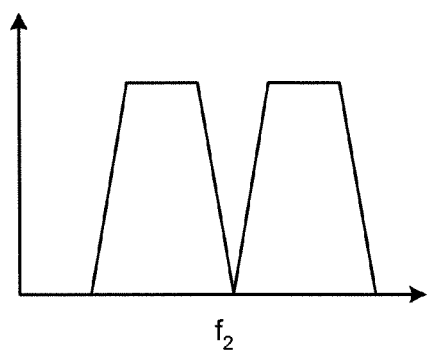
Figures 3, 4:
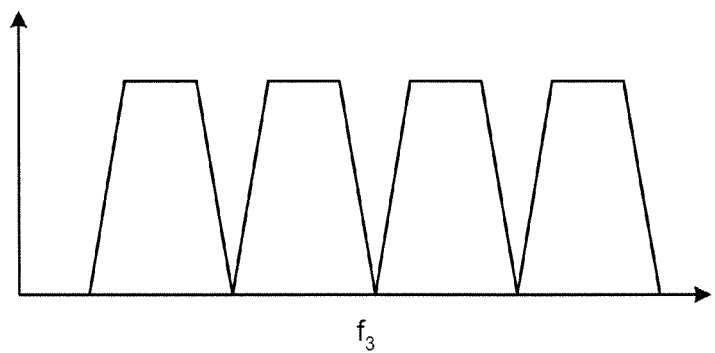

As shown in FIGS. 2-1, 2-2, and 2-3, changing a subcarrier copes with a difference in bandwidth depending on each frequency band. Specifically, the transmitter 1 executes mapping depicted in FIGS. 2-1 to 2-3 under control of the controller 4. On the other hand, the receiver 2 effects input to the same FFT 23 irrespective of frequency bands utilized and extracts a necessary subcarrier alone under control of the controller 4. When the necessary subcarrier alone is taken out at an output of the FFT 23, the single FFT 23 adapted to the widest frequency band performs reception processing according to a transmission band of each frequency band.

In a system that the terminal belongs to, a OFDM symbol timing is the same in a OFDM symbol time in each frequency band, and a once achieved synchronization is applied even after a working frequency is switched. Sampling rates of the D/A converter 5 and the A/D converter 6 are designed according to a frequency having the widest band, and these converters operate at a high rate even if a transmission band is narrower.

Although the BPF 9 performs filtering processing for each frequency, the IF and other units on rear stages are common in respective frequencies and designed with the widest transmission band being determined as a reference. At the time, high-speed sampling and a large FFT size enable discriminating a frequency with a high resolution.

According to the embodiment, when the single system can use a plurality of frequency bands, a design adapted to a frequency having the widest band is carried out, and the frequency synthesizer 31 switches frequencies under control of the controller 4. In regard to processing of a baseband signal, hardware is shared in communication in all frequency bands. As a result, receivers can receive signals having different frequencies and bands by simpler structure and control compared with the conventional scheme.

Although the example where the three discontinuous frequency bands $f_1$, $f_2$, and $f_3$ are used is explained in conjunction with the embodiment, the present invention is not restricted thereto, and the number of frequency bands may be two, four, or above. As to a bandwidth in each frequency band, a high frequency band does not necessarily have a wider bandwidth than that of a low frequency band. For example, a bandwidth of a high frequency band may be the same as that of a low frequency band, or even a low frequency band has a wide bandwidth. The hardware is shared in communication in all frequency bands in processing of a baseband signal in the embodiment, but a part of the hardware may be shared, the remaining part may be independently configured like the conventional technology.

Second Embodiment

FIG. 3 is a view of a structural example of a second embodiment of a communication apparatus (multiband compatible terminal) according to the present invention. It is to be noted that like reference numerals denote the same structures as those in the foregoing embodiment, thereby omitting an explanation thereof. Here, only an operation that is different from the first embodiment will be explained.

As shown in FIG. 3, a terminal has a configuration different from that in the first embodiment and includes a transmitter 1a, a receiver 2a, and a controller 4a, and the transmitter 1a includes N channel encoders 11a-1 to 11a-N, N modulators 12a-1 to 12a-N, and one IFFT unit 13, whilst the receiver 2a includes one FFT unit 23, N demodulators 22a-1 to 22a-N, and channel decoders 21a-1 to 21a-N.

According to the embodiment, as shown in FIGS. 4-1, 4-2, and 4-3, a bandwidth of a frequency having the narrowest transmission band is determined as one channel, a plurality of channels are bundled and used in a frequency band having a wide band, and the transmitter 1 thereby copes with a difference in bandwidth depending on each frequency band under control of the controller 4a. On the other hand, like the first embodiment, an FFT size is designed based on a wide band, and the receiver 2 effects input to the same FFT 23 irrespective of frequency bands to be used and extracts a necessary subcarrier alone under control of the controller 4a. It is to be noted that the same frame format is used with respect to the channels in a wide transmission band.

According to the embodiment, in addition to the same operation as that in the first embodiment, the single FFT and receiving circuits (the demodulator and the channel decoders) having the number of channels adapted to the widest transmission band case are used to perform reception processing under control of the controller 4a. As a result, receivers can receive signals having different frequencies and bands by simpler structure and control compared with the conventional scheme. At the time, the required number of receiving circuits is the same as number of used channels, but these circuits are the plurality of same circuits. Therefore, a development cost is equal to a cost for one channel.

Third Embodiment

Figure 5:
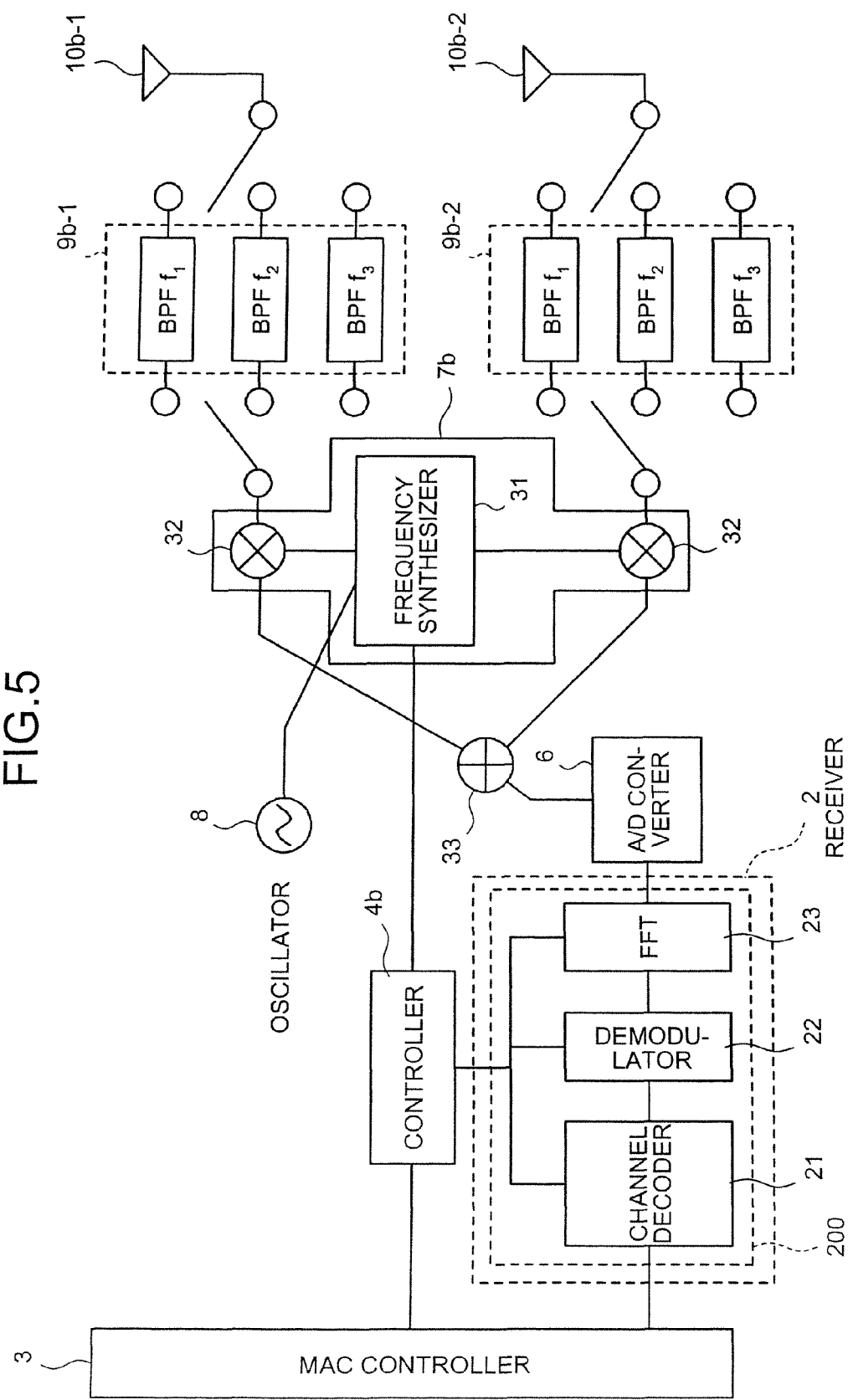
FIG. 5 is a view of a structural example of a third embodiment of a communication apparatus (multiband compatible terminal) according to the present invention.

FIG. 5 is a view of a structural example of a third embodiment of a communication apparatus (multiband compatible terminal) according to the present invention. It is to be noted that like reference numerals denote structures equal to those in the first embodiment or the second embodiment, thereby omitting an explanation thereof. Only an operation that is different from that in the first embodiment or the second embodiment will be explained.

According to the embodiment, structures from a receiver antenna to a down-converter 7b are duplexed (including antennas 10b-1 and 10b-2 and BPF 9b-1 and 9b-2), and a configuration compatible with a reception diversity is provided. An operation in the third embodiment will now be explained.

According to the embodiment, an example where electric waves in a plurality of discontinuous frequency bands can be simultaneously received, e.g., an example where a frequency band $f_1$ and a frequency band $f_2$ are simultaneously received as shown in FIG. 5 is assumed. A controller 4b issues a command to a frequency synthesizer 31 to receive the frequency band $f_1$ at one receiver and receive the frequency band $f_2$ at the other receiver. The frequency synthesizer 31 generates a corresponding frequency to down-covert a corresponding BPF output. At the time, the frequency is adjusted in such a manner that signals from both the receiving systems when seen in a baseband do not superimpose in terms of frequency.

Figure 6:
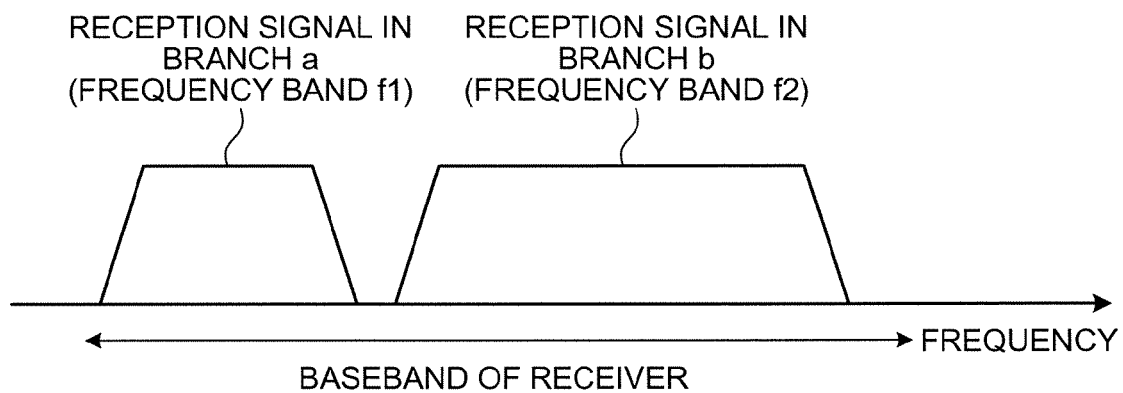
FIG. 6 is a view of a state where signals from respective receiving systems are shifted in terms of frequency.

An adder 33 adds the down-converted signals from both the receivers, an A/D converter 6 samples the added signal, and then an FFT unit 23 converts the sampled signal into a signal for each subcarrier. Since the signals from both the receivers are shifted in terms of frequency, they can be demodulated without being simultaneously superimposed by a single FFT operation (corresponding to a reception signal in a branch a and a reception signal in a branch b depicted in FIG. 6). It is to be noted that a condition is that a OFDM symbol timing is equal in the frequency bands.

It is to be noted that data before A/D conversion are added in the example depicted in FIG. 5, but A/D conversion may be carried out in each receiving system, and a digital value may be added to the converted data.

As explained above, according to the embodiment, when electric waves in a plurality of discontinuous frequency bands can be simultaneously received, processes from the antenna to execution of down-conversion are individually carried out, and then both signals are combined. As a result, circuits used at subsequent steps (including baseband processing) can be shared, and signals having the frequency bands can be demodulated at a time. The transmission diversity using signals having different frequency bands or seamless handover between different frequency bands can be enabled.

INDUSTRIAL APPLICABILITY

As explained above, the communication apparatus according to the present invention is useful when a single system can use a plurality of frequency bands, and it is particularly suitable as a multiband compatible terminal that receives signals having different frequencies and system bandwidth.

The invention claimed is:

1. A communication apparatus employed in a system that uses a plurality of discontinuous frequency bands, the communication apparatus comprising:
   a filtering unit including a plurality of band pass filters associated with signals having the respective frequency bands;
   a controlling unit that controls each unit that transmits/receives signals having the respective frequency bands;
   a down-converting unit that down-converts a filtered signal into a baseband signal while switching frequencies under control of the controlling unit;
   a demodulating unit that performs predetermined reception processing under control of the controller; and
   a modulating unit that performs predetermined transmission processing under control of the controller,
   wherein a part of hardware is shared in communication in the plurality of frequency bands with respect to processing of the baseband signal; and
   the demodulating unit includes a single fast Fourier transform (FFT) unit and the modulating unit includes a single inverse FFT unit, each adapted to a widest frequency band of the plurality of frequency bands.

2. The communication apparatus according to claim 1, wherein the modulating unit changes the number of subcarriers and adjusts a bandwidth to cope with different bandwidths of the plurality of frequency bands.

3. The communication apparatus according to claim 1, wherein
   transmission signals in a plurality of channels are generated by a single inverse FFT (IFFT) processing operation, and reception signals in the channels are generated by a single FFT processing operation.

4. The communication apparatus according to claim 3, wherein
   the modulating unit further includes an encoder and a modulator that are independent for each channel, a channel having the narrowest bandwidth being determined as one channel,
   the demodulating unit further includes a demodulator and a decoder corresponding to each channel extracted by the FFT processing, and
   the channels are bundled to adjust a bandwidth.

5. A communication apparatus associated with a system that uses a plurality of discontinuous frequency bands and that unifies an orthogonal frequency division multiplexing symbol timing in respective frequency bands, the communication apparatus comprising:
   a filtering unit including a plurality of band pass filters associated with signals having the respective frequency bands;
   a controlling unit that controls each unit that transmits/receives signals having the respective frequency bands;
   a down-converting unit that down-converts a filtered signal into a baseband signal while switching frequencies under control of the controlling unit;

a demodulating unit that performs predetermined reception processing under control of the controlling unit; and a modulating unit that performs predetermined transmission processing under control of the controlling unit, wherein a part of hardware is shared in communication in all frequency bands with respect to processing of the baseband signal; and the demodulating unit includes a single fast Fourier transform (FFT) unit and the modulating unit includes a single inverse FFT unit, each adapted to a widest frequency band of the plurality of frequency bands.

6. The communication apparatus according to claim 5, wherein the modulating unit changes the number of subcarriers and adjusts a bandwidth to cope with different bandwidths of the plurality of frequency bands.

7. The communication apparatus according to claim 5, wherein transmission signals in a plurality of channels are generated by a single inverse FFT (IFFT) processing operation, and reception signals in the channels are generated by a single FFT processing operation.

8. The communication apparatus according to claim 7, wherein the modulating unit further includes an encoder and a modulator that are independent for each channel, a channel having the narrowest bandwidth being determined as one channel, the demodulating unit further includes a demodulator and a decoder corresponding to each channel extracted by the FFT processing, and the channels are bundled to adjust a bandwidth.

9. A communication apparatus associated with a system that simultaneously uses a plurality of discontinuous frequency bands and that unifies an orthogonal frequency division multiplexing symbol timing in respective frequency bands, the communication apparatus comprising:

a plurality of receiving antennas;

filtering units that include a plurality of band-pass filters respectively associated with signals having the respective frequency bands, and that correspond to a number of the receiving antennas;

a controlling unit that controls each unit that receives signals having the respective frequency bands;

a down-converting unit that down-converts a plurality of filtered signals into baseband signals while switching frequencies under control of the controlling unit;

a synthesizing unit that synthesizes the plurality of baseband signals; and a demodulating unit that performs predetermined reception processing with respect to the synthesized signal under control of the controlling unit, wherein, when the plurality of receiving antennas receive signals having a plurality of frequency bands, the down-converting unit and the synthesizing unit convert the frequencies of the respective signals such that the respective signals are not superimposed, and then synthesize the frequency-converted signals, and the demodulating unit simultaneously extracts signals on a subcarrier included in the signals having the plurality of frequency bands by a single fast Fourier transform (FFT) operation using a single FFT unit adapted to a widest frequency band of the plurality of frequency bands.

* * * * *